US010271381B2

(12) United States Patent
Praveen R. et al.

(10) Patent No.: US 10,271,381 B2
(45) Date of Patent: Apr. 23, 2019

(54) LEGACY MODBUS COMMUNICATION DEVICES

(71) Applicant: Honeywell International Inc., Morris Plains, NJ (US)

(72) Inventors: Krishna Praveen R., Karnataka (IN); Prasad Samudrala, Karnataka (IN); Gorthi Madhusudan, Andhrapradesh (IN); Mario Benjamin Dias, Perth (AU)

(73) Assignee: Honeywell International Inc., Morris Plains, NJ (US)

( * ) Notice: Subject to any disclaimer, the term of this patent is extended or adjusted under 35 U.S.C. 154(b) by 178 days.

(21) Appl. No.: 15/600,903

(22) Filed: May 22, 2017

(65) Prior Publication Data

US 2018/0338348 A1 Nov. 22, 2018

(51) Int. Cl.
| | |
|---|---|
| *H04W 24/10* | (2009.01) |
| *H04W 72/12* | (2009.01) |
| *H04W 92/10* | (2009.01) |
| *H04W 92/08* | (2009.01) |
| *H04L 29/08* | (2006.01) |
| *H04J 3/16* | (2006.01) |

(52) U.S. Cl.
CPC ......... *H04W 92/10* (2013.01); *H04L 67/2833* (2013.01); *H04W 92/08* (2013.01); *H04L 2209/76* (2013.01)

(58) Field of Classification Search
USPC ................................................ 709/249, 223
See application file for complete search history.

(56) References Cited

U.S. PATENT DOCUMENTS

| | | |
|---|---|---|
| 5,880,015 A | 3/1999 | Hata |
| 6,434,157 B1 | 8/2002 | Dube' et al. |
| 7,051,143 B2 | 5/2006 | White, III et al. |
| 7,246,193 B2 | 7/2007 | Rotvold et al. |
| 8,423,308 B2 | 4/2013 | Lewis et al. |
| 8,929,425 B2 | 1/2015 | Chen |
| 9,118,509 B2 | 8/2015 | Jang |
| 9,544,081 B2 * | 1/2017 | Samudrala ............ H04J 3/1694 |

(Continued)

OTHER PUBLICATIONS

Field Device Access Point, Honeywell, printed May 2, 2017, 2 pages.

(Continued)

*Primary Examiner* — Jude Jean Gilles
(74) *Attorney, Agent, or Firm* — Kermit D. Lopez; Luis M. Ortiz; Loza & Loza, LLP (57) ABSTRACT

Methods and systems for integrating communication devices into an industrial wireless system. A communications interface can be enabled on a field device access point from a user interface associated with a wireless device manager. The field device access point is configured to enable registers to read from different slave devices at different speeds and different data types. A proxy object can be implemented, which communicates with RTU (Remote Terminal Unit) devices and a cache can be implemented to store read data from different RTU slave. The read data is then periodically published to the wireless device manager through a wireless interface, thereby permitting the RTU devices or TCP devices to connect to the industrial wireless network using the field device access point.

20 Claims, 3 Drawing Sheets

(56) References Cited

U.S. PATENT DOCUMENTS

| | | | |
|---|---|---|---|
| 2002/0059614 A1* | 5/2002 | Lipsanen | H04N 7/163 |
| | | | 725/75 |
| 2005/0149631 A1 | 7/2005 | Decker | |
| 2005/0256964 A1 | 11/2005 | Dube | |
| 2012/0019674 A1* | 1/2012 | Ohnishi | G08C 17/00 |
| | | | 348/207.1 |
| 2013/0227689 A1* | 8/2013 | Pietrowicz | G01R 1/20 |
| | | | 726/23 |
| 2017/0299633 A1* | 10/2017 | Pietrowicz | H04L 63/0227 |

OTHER PUBLICATIONS

Modbus 101—Introduction to Modbus, Modbus Tutorial from Control Solutions, https://www.csimn.com/CSI_pages/Modbus101.html, printed May 3, 2017, 11 pages.

Modbus—Wikipedia, printed May 3, 2017, 12 pages.

Modbus for Field Technicians, Revision 1.0, Chipkin Automation Systems (2010) Vancouver, BC, Canada, 77 pages.

Modbus Application Protocol Specification V1.1b3, Apr. 26, 2012, 50 pages.

Modbus Messaging on TCP/IP Implementation Guide V1.0b, Oct. 24, 2006, 46 pages.

Modbus Protocol, http://www.modicon.com/techpubs/toc7.html, Jan. 2000, 74 pages.

Wireless Device Manager, Honeywell, printed May 2, 2017, 2 pages.

* cited by examiner

LEGACY MODBUS COMMUNICATION DEVICES

TECHNICAL FIELD

Embodiments are generally related the field of industrial networks. More specifically, embodiments relate to communicating data between networks to control or monitor networked devices. Embodiments further relate to techniques for integrating legacy communications devices into industrial wireless systems.

BACKGROUND

Process control systems, like those used in chemical, petroleum, or other processes, typically include at least one centralized process controller communicatively coupled to at least one host or operator workstation and to one or more field devices via analog and/or digital buses or other communication lines or channels. The field devices, which may be, for example, valves, valve positioners, switches, transmitters (e.g., temperature, pressure and flow rate sensors), etc., perform functions within the process such as opening or closing valves and measuring process parameters.

The process controller receives signals indicative of process measurements made by the field devices and/or other information pertaining to the field devices via an input/output (I/O) device, uses this information to implement a control routine, and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, configuring the process, documenting the process, etc.

In the past, standard communication protocols were developed to enable controllers and field devices from different manufacturers to exchange data using standard formats. One such standard communication protocol, the Modbus protocol, has been in use in process control systems for more than twenty years. The Modbus protocol can define a message structure that controllers will recognize and use regardless of the types of networks over which they communicate. The Modbus protocol establishes a common format for the layout and content of message fields. Modbus defines a process for controllers to request access to other devices, for the controllers and devices to respond to requests, and for error detection and reporting.

During communications on a Modbus network, the protocol determines how each controller or device will know its device address, recognize a message addressed to it, determine the kind of action to be taken, and extract any data or other information contained in the message. If a reply is required, the controller or device will construct the reply message and send it using the Modbus protocol. The Modbus protocol is known in the art and is described in detail in numerous articles, brochures and specifications published, distributed and available from, among others, manufacturers of devices using the Modbus protocol. As a result, the details of the Modbus communication protocol will not be described in detail except to the extent they relate to the disclosed embodiments.

Modbus employs a master-slave query-response cycle for exchanging information between controllers and field devices. Each device can be assigned an address ranging between, for example, 1 and 255. One device (i.e., the "master") can initiate transactions, such as queries, set point changes, diagnostics, and the like by transmitting a message addressed to another device (i.e., the "slave"). Under the Modbus protocol, the message transmitted by the master device is formatted to include the device address of the slave device, a function code defining the requested action, any data to be sent to the slave device, and error-checking information. The slave device detects and receives the message from the master based on the address in the message, and processes the transaction or function indicated by the function code in the message. After processing the transaction or performing the requested function, the slave transmits a response message constructed using the Modbus protocol and containing information confirming the action taken, any data to be returned to the master, and error-checking information. The Modbus protocol supports both an ASCII mode (wherein messages are transmitted as ASCII characters) and an RTU mode (wherein messages are transmitted as hexadecimal characters).

Data can be exchanged between devices in the Modbus network using register numbers. Each process control parameter used in the Modbus network is assigned a numeric register number within a set range of available register numbers. The devices in the Modbus network are configured to store and exchange the process control parameters according to their assigned register number. In order to obtain the value of a process control parameter from a slave device, a master device formats and transmits a request message including the address of the slave device and the register number for the process control parameter. Upon receiving the request message, the slave device reads the current value for the register number, and formats and transfers a response message with the register number and stored value.

Many legacy industrial Modbus RTU (Remote Terminal Unit) enabled field devices (e.g., actuator, industrial power measuring meter, process measuring transmitter, and many other process measuring devices) remain in operation in industrial plants. Presently and conventionally, to communicate such devices to a control room requires wired connections. This is an extremely expensive and time consuming process. A typical industrial plant may possess thousands of legacy communications devices, leading to lot of wiring going into the control room and in the field from these device. Maintaining these wiring is extremely complicated during maintenance, any breakage in the field wiring takes longer time to fix. Thus, if a solutions can be found to enable such legacy devices to communicate via wireless communications, significant costs savings may accrue.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved communications methods and systems for use in industrial networks.

It is another aspect of the disclosed embodiments to provide for an improved method and system for controlling or monitoring legacy communications devices in industrial plants.

It is yet another aspect of the disclosed embodiments to provide for a method and system for integrating legacy communications devices into industrial wireless systems.

The aforementioned aspects and other objectives and advantages can now be achieved as described herein. Methods and systems are disclosed for integrating communication devices into an industrial wireless system. A communications interface can be enabled on a field device access point from a user interface associated with a wireless device manager. The field device access point is configured to enable registers to read from different slave devices at different speeds and different data types. A proxy object can be implemented, which communicates with RTU (Remote Terminal Unit) devices and a cache can be implemented to store read data from different RTU slave. The read data is then periodically published to the wireless device manager through a wireless interface, thereby permitting the Modbus RTU devices or Modbus TCP devices to connect to the industrial wireless network using the field device access point.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

As indicated previously, thousands of legacy industrial communications devices (e.g., Modbus RTU field devices) such as actuators, industrial power measuring meters, process measuring transmitters, and other process measuring devices exist in industrial plants, and there is a need to facilitate communications between such devices and the control rooms and other systems and devices. Presently, the only way to accomplish this is through the use of wired connections, which is an expensive if not impossible process. The disclosed embodiments can allow thousands of such devices to be enabled for communications over wireless networks, which will results in very significant cost savings for customers and other users.

Note that the term "Modbus" as utilized herein relates to a serial communications protocol published by Modicon (now Schneider Electric) in 1979 for use programmable logic controllers. Simple and robust, it has since become a de facto standard de facto communication protocol and is now a commonly available means of connecting industrial electronic devices. The main reasons for the use of Modbus in an industrial environment is that it was developed with industrial applications in mind, is easy to deploy and maintain, and can move raw bits or words without placing many restrictions on venders. Modbus enables communication among many devices connected to the same network, for example, a system that measures temperature and humidity and communicates the results to a computer. Modbus is often used to connect a supervisory computer with an RTU in SCADA (Supervisory Control and Data Acquisition) systems.

Note that although the example embodiments disclosed herein discuss various Modbus devices and systems, it should be understood that the disclosed embodiments are not limited to the use of the Modbus communications protocol and that other serial communication protocols may be considered. For exemplary purposes, however, Modbus is discussed herein as an example of a serial communications protocol found in many legacy devices in industrial applications.

The disclosed embodiments can assist customers and other users to permit any legacy RTU devices (e.g., Modbus-RTU enabled devices) to communicate with a wireless network in an industrial plant setting without any change to the legacy device while permitting all legacy device data to be available to, for example, a control room of an industrial plant. This approach reduces costs by avoiding extra intermediate HMI (Human Machine Interface) devices, additional wiring and switches, and so on. This approach can also render legacy Modbus-TCP devices wireless, which will result in additional value for a customer (e.g., a company or organization running an industrial plant) or other users by having legacy device also under a single wireless gateway.

Figure 1:
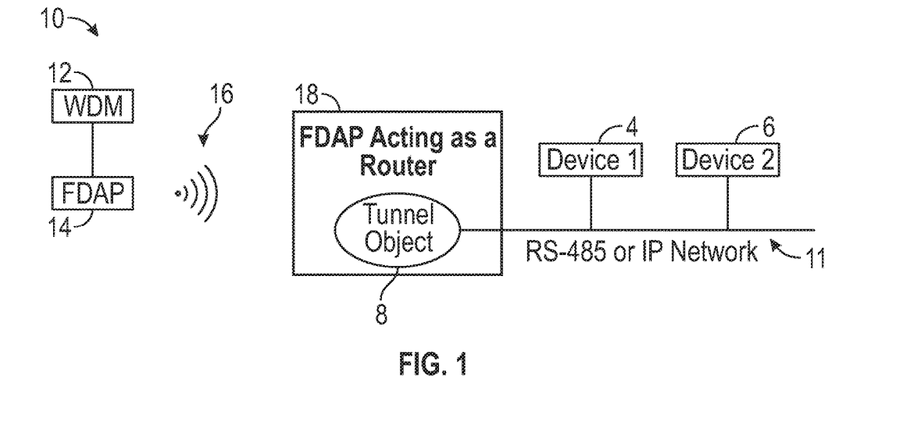
FIG. 1 illustrates a schematic diagram of a system for integrating legacy communications devices into an industrial wireless system, in accordance with an example embodiment.

FIG. 1 illustrates a schematic diagram of a system 10 for integrating legacy communications devices into an industrial wireless system, in accordance with an example embodiment. The system 10 shown in FIG. 1 includes a WDM (Wireless Device Manager) 12 connected to an FDAP (Field Device Access Point) 14. The FDAP 14 communicates through a wireless communications link 16 with another FDAP 18. The FDAP 18 can function as a router and includes a tunnel object 8 that connects to and communicates with a network 11, which may be an RS-485 interface or IP network.

Note that an example of a WDM is the Honeywell OneWireless™ Wireless Device Manager (WDM) that manages a ISA100 Wireless™ (IEC 62734) field device network and field instrumentation such as Honeywell's OneWireless XYR™ 6000 transmitters and OneWireless Field Device Access Points, Cisco® Aironet® 1552S Access Points, HART and WirelessHART devices, and third-party field devices. Users can add and commission ISA100 Wireless field instruments in less than two minutes without having to do any data mapping or non-value-added engineering due to features such as Experion® CDA and Honeywell Enraf interface, over-the-air firmware upgrades and provisioning, and an intuitive Web-based user interface.

A WDM such as the WDM 12 illustrated herein can host, for example, the ISA100 Wireless system manager, security manager and gateway. WDM 12 can function as a gateway that handles communications between, for example, ISA100 Wireless field instruments and information systems. The WDM 12 can host a rich portfolio of interfaces, including Modbus, HART, OPC-UA, OPC-DA, and Experion CDA, Honeywell Enraf, and Gateway General Client Interface (GCI). The WDM 12 can also function as a system manager that governs field devices and communications among such services. As a security manager, the WDM 12 can issue security keys to wireless devices for joining a wireless network. With a WDM such as the WDM 12, users can rapidly integrate wireless field instruments into their control and advanced applications, and easily monitor and troubleshoot wireless network with preconfigured report and key performance indicators. The WDM 12 also permits users to reduce cyber security threats with an application proxy agent and a secured HTTPS-based interface.

Note that the serial communications protocol described herein can also be another proprietary or standard wireless communications protocol. The data received from serial communication devices as discussed herein can be transmitted over wireless protocols such as ISA100, WirelessHART, or other similar wireless protocols, etc.

It is also important to note that RS-485, also known as TIA-485(-A), EIA-485, is a standard defining the electrical characteristics of drivers and receivers for use in serial communication systems. Electrical signaling is balanced and multipoint systems are supported under an RS-484 arrangement. An IP network is a communication network that uses Internet Protocol (IP) to send and receive messages between one or more computers. As one of the most commonly used global networks, an IP network can be implemented in Internet networks, local area networks (LAN), and enterprise networks. One or more devices 4, 6, etc., can be connected to and communicate with the network 11 as shown in FIG. 1. The devices 4, 6 may be, for example, legacy communication devices that follow a particular serial communications protocol such as Modbus. In some example embodiments, each of the devices 4 and 6 may be legacy Modbus RTU devices. Devices 4 and 6 may also be Modbus-TCP devices.

An example of an FDAP that can be utilized as FDAP 14 and/or FDAP 18 is, for example, Honeywell OneWireless™ Field Device Access Point (FDAP), which is an industrial meshing access point for ISA100™ Wireless (IEC62734) and WirelessHART (IEC 62591) field instruments and rated for use in hazardous plant environments. This particular FDAP uses Honeywell's intelligent wireless algorithms combination to extend the wireless coverage of field instruments by a factor of 1.5, thereby minimizing the infrastructure required.

An FDAP such as described above can auto-discover neighboring wireless devices such as other access points and ISA100 Wireless and WirelessHART field instruments to form a secure IEEE 802.15.4 mesh network. The device supports all ISA100 Wireless and WirelessHART field instruments, including wired HART field instruments connected with wireless adapters. The FDAP enables users to implement wireless field instruments in harsh multi-path indoor and outdoor environment since its antenna diversity enhances communication reliability in such environments. In addition, it enables use of wireless field instruments for critical monitoring or open loop control in hazardous environments (Class 1 Div 1/Zone 1) that require update rates of less than 10 seconds.

The embodiment shown in FIG. 1 thus depicts an architecture for connecting multiple Modbus RTU or Modbus-TCP devices such as devices 4, 6, etc., to an industrial wireless network such as ISA100 using a single FDAP such as the FDAP 18 shown in FIG. 1. Multiple Modbus RTU devices can be connected to the FDAP 18, for example, over an RS-485 interface or network such as the interface or network 11. As will be described in greater detail herein, a user can configure the FDAP from a wireless user interface to instruct the FDAP how to communicate with Modbus RTU slave devices (e.g., such as the slave devices 4 and 6 shown in FIG. 1 or 32, 34, 36 shown in FIG. 2) and extract data from those devices in terms of scanning data at multiple predefined intervals such as scanning process data at a faster rate, slowly change data at different slower rates, etc., and sending such data to a wireless gateway.

Thus, a user can enable a Modbus interface on the FDAP 18 from the WDM 12 (e.g., a WDM user interface). The user can also configure the FDAP 18 to enable registers (e.g., Modbus registers) to read from different Modbus slave devices at different speeds and different data types. The FDAP 18 implements a proxy object to communicate with multi-dropped and many Modbus-RTU devices, and also implements a cache to store the read data from slave devices. The FDAP 18 also periodically publishes such data to the WDM 12 through a wireless interface. The WDM 12 can also read such data periodically.

Figure 2:
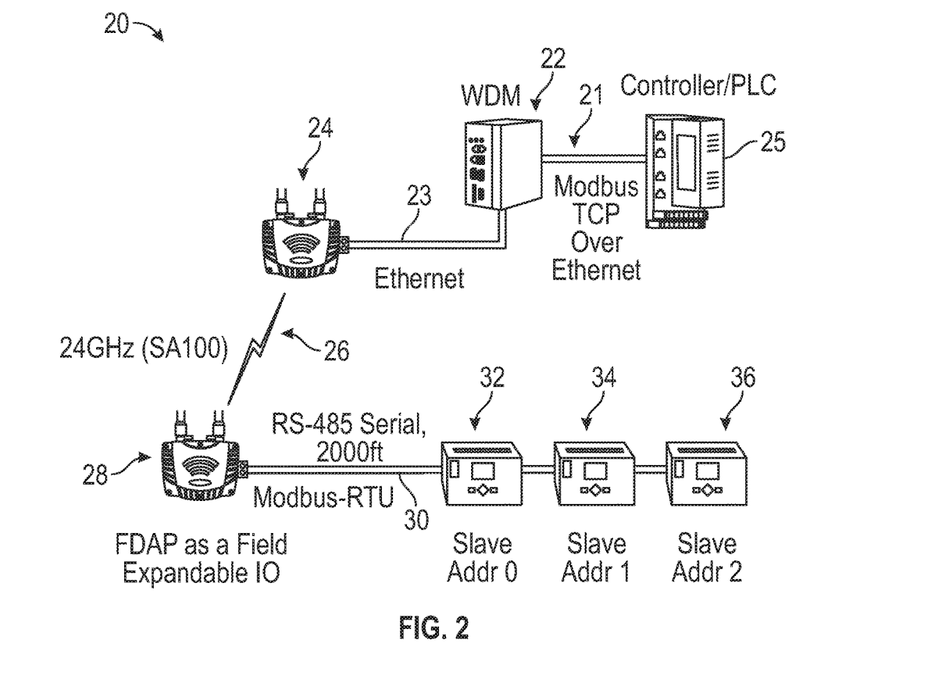
FIG. 2 illustrates a schematic diagram of a system for integrating legacy communications devices into an industrial wireless system, in accordance with another example embodiment.

FIG. 2 illustrates a schematic diagram of a system 20 for integrating legacy communications devices into an industrial wireless system, in accordance with another example embodiment. System 20 thus illustrates a slightly different embodiment than that of FIG. 1. The system 20 shown in FIG. 2 includes an FDAP 28 that can act as a FEWIO (Field Expandable Wireless IO) device that communicates through a communications link 26 (e.g., 2.4 GHz/ISA100) with an FDAP 24 that communicates via an Ethernet communications link 23 with a WDM 22 that further communicates with other networks or systems such as PLC (Programmable Logic Controller) or some other industrial controller 25 through Modbus TCP 21 over the Ethernet communications link 23 or another Ethernet connection. Note that the PLC 25 may be a Modbus-RTU enabled PLC.

THE FDAP 28 further communicates with multiple slave devices 32, 34, 36, which may be, for example, Modbus RTU slave devices. Communication between the FDAP 28 and the slave devices 32, 34, 36 can be facilitated by a Modbus-RTU interface 30 (e.g., RS-484 serial communications, 2000 ft.). The FDAP 28 thus has a RS-485 serial Interface 30 that can be used to connect to serial interface devices 32, 34, 36 to collect data over wire and transport it to a control room over wireless communications network (e.g., the wireless communications link 26) or other forms or RF wireless communications. The FDAP 28 acts as a Modbus master to collect data for Modbus slave devices 32, 34, 36. Note that Modbus baud rates can be configured, in addition to scan rates for different registers. The architecture shown in FIG. 2 further provides Modbus-RTU multi drop support.

Because the FDAP 28 can function as a Modbus-RTU master, the arrangement shown in FIG. 2 allows for the FDAP 28 to communicate with multiples PLCs/Devices configured as Modbus slaves. In addition, Modbus register values can be read from PLCs/Devices periodically and the read data sent over a wireless communications link, such as the communications link 26 shown in FIG. 2. In some scenarios, a maximum of 100 discrete input registers and coils and/or 100 input registers and holdings registers can be read.

Thus, when a Modbus RTU interface is enabled, the FDAP acts as an FEWIO along with Routing functionality. The FDAP may need a power restart/warm restart to go from the FDAP/Field Router implementation to an FEWIO. A new ICON can be displayed for a user in the context of a user interface when the FDAP joins as a Field Expandable IO. Disabling the Modbus-RTU Interface will also make the IO to return to an FDAP or a router mode.

The WDM user interface allows a user to configure Modbus information within the disclosed FDAP to read data from different registers in Modbus slave devices. In some example embodiments, the FDAP can hold a 100 Modbus register configuration.

An example FDAP configuration is discussed as follows. A total of 100 registers are allowed to be configured in FDAP, and each entry in FDAP can be mapped to one register in one of the slave devices. The register can register a type such as, for example, an Input Register, a Holding Register, a Discrete Register, or a Coil. The FDAP can be instructed to read this register from slave devices at a faster rate or slower rate.

For example, the first entry in shown in Table 1 below informs FDAP to Input Register address 0x20 from a slave device address 0x0001. The read data is a Type Float value, so the FDAP can read two consecutive registers to read the complete float value from device. Given a Fast Scan type register, the FDAP can read this register from the slave device periodically at a configured faster rate and then publishes the data to the WDM.

TABLE 1

| Register Name | Slave Addr | Register Addr | Register Type | Data Type | Scanning Type |
| --- | --- | --- | --- | --- | --- |
| MODBUS_REG0 | 0x0001 | 0x20 | Input Register | Float | Fast |
| MODBUS_REG1 | 0x0001 | 0x22 | Holding Register | Int32 | Slow |
| MODBUS_REG2 | 0x0002 | 0x50 | Input Register | Int32 | Fast |
| MODBUS_REG2 | 0x0002 | 0x52 | Discrete | Int16 | Slow |
| MODBUS_REG99 | 0x0003 | 0x70 | Coil | Binary | Slow |

Once a Modbus arrangement is configured in the FDAP, it will be retained in non-volatile memory to preserve during power restart operations. Additionally, saving and restoring (e.g., such as backup and restore) the Modbus Configuration in user interface can be enabled to avoid accidental device deletion and reconfiguration. A hand coded XML format or text format can also be provided to re-use for multiple IO configurations.

It should be appreciated that the disclosed embodiments are discussed in the context of an implementation of an ISA Tunnel Object in FDAP acting as an ISA100 Field Router. It is important to note, however, that such embodiments are not limited to ISA100 Tunnel Object implementations. That is, the disclosed solution can be implemented with other wireless protocols also. For example, when FDAP acts as a WirelessHART Field Router, a similar functionality can be implemented using vendor defined HART commands in FDAP. Multiple HART commands can be defined to configure a Modbus Register mapping in FDAP and to read the slave device Modbus register values from the WDM and publish the slave device Modbus register values to the WDM.

Figure 3:
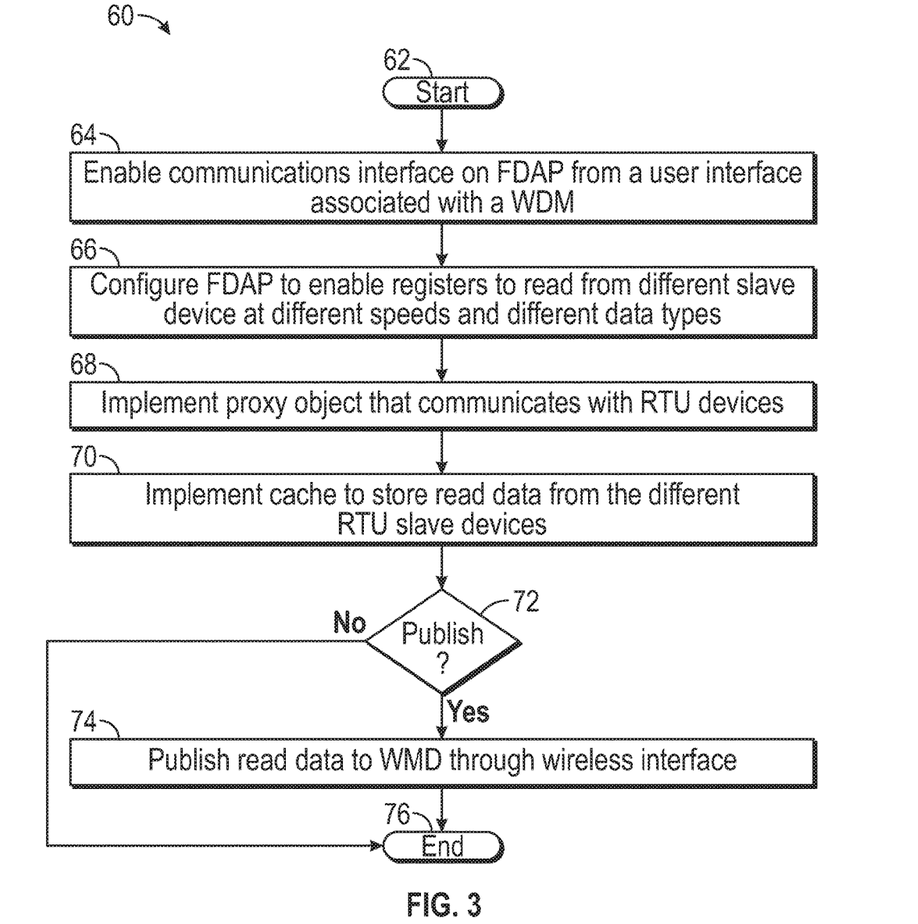
FIG. 3 illustrates flow chart of operations depicting logical operational steps of a method for integrating legacy communication devices into an industrial system, in accordance with an example embodiments.

FIG. 3 illustrates flow chart of operations depicting logical operational steps of a method 60 for integrating legacy communication devices into an industrial system, in accordance with an example embodiment. As indicated at block 62, the process begins. As shown next at block 64, a step or operation can be implemented to enable a communications interface on an FDAP from a user interface associated with a WDM. As explained previously, the FDAP can communicate with an industrial wireless network, and the communications interface is based on a serial communications protocol. Next, as shown at block 66, a step or operation can be implemented to configure the FDAP to enable at least one register to read from different slave devices at different speeds and different data types.

Then, as illustrated respectively at blocks 68 and 70, steps or operations can be processed to implemented a proxy object that communicates with a plurality of RTU (Remote Terminal Unit) devices and to implement a cache to store read data from the different RTU slave devices among the plurality of RTU devices. Thereafter, as shown at decision block 72, a test can be implemented to determine whether or not to publish the read data to the WDM.

If not, then the process simply ends, as shown at block 76. If so (i.e., "yes"—publish) then as indicated at block 74, a step or operation can be implemented to publish (this can be done periodically) the read data to the WDM through a wireless interface, thereby permitting the plurality of RTU devices or a plurality of TCP (Transmission Control Protocol) devices to connect to the industrial wireless network using the field device access point as a result of enabling the communications interface on the field access point, configuring the field device access point, implementing the proxy object, and the cache and periodically publishing the read data to the WDM. Note that the aforementioned TCP and RTU devices are also based on the same serial communications protocol as the FDAP.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
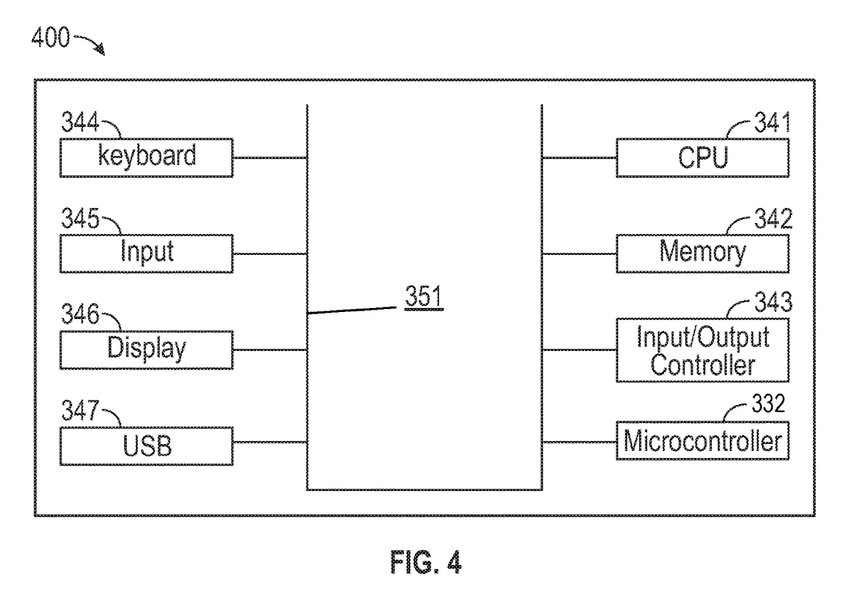
FIG. 4 illustrates a schematic view of a computer system/ apparatus, which can be implemented in accordance with an example embodiment.
Figure 5:
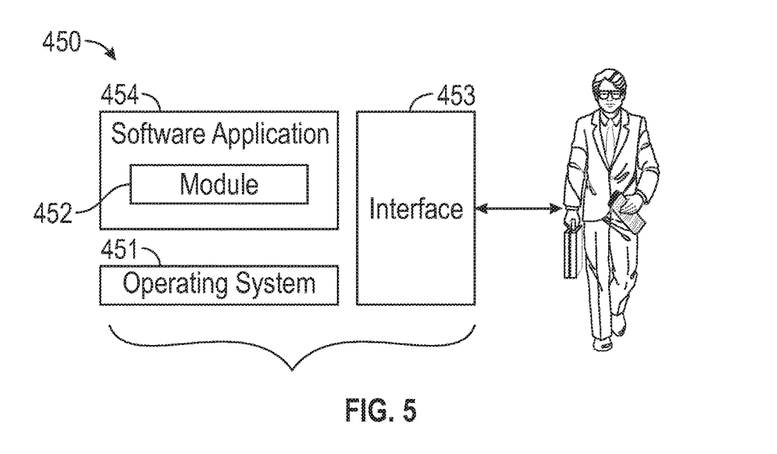
FIG. 5 illustrates a schematic view of a software system including a module, an operating system, and a user interface, which can also be implemented in accordance with an example embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server).

In other example embodiments, data-processing system/apparatus 400 may be, for example, a standalone desktop computer, a laptop computer, a Smartphone, a pad computing device and so on, wherein each such device is operably connected to and/or in communication with a client-server based network or other types of networks (e.g., cellular networks, Wi-Fi, etc.). In still other example embodiments, the apparatus 400 may provide and facilitate the transmitter firmware discussed herein.

FIG. 5 illustrates a computer software system/apparatus 450 for directing the operation of the data-processing system/apparatus 400 depicted in FIG. 4. The computer/software apparatus 450 shown in FIG. 5 can include a software application 454 (which can be stored for example in memory 342 shown in FIG. 4), a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The software application 450 can include a module 452 as discussed previously. The data-processing system/apparatus 400 can receive user commands and data through the interface 453; these inputs may then be acted upon by the data-processing system/apparatus 400 in accordance with instructions from operating system 451 and/or software application 454.

The interface 453 in some embodiments can serve to display results, whereupon a user may supply additional inputs or terminate a session. The software application 454 can include module(s) 452, which can, for example, implement the various instructions or operations such as those discussed herein with respect to FIGS. 1-5 herein. Module 452 may also be composed of a group of modules or sub-modules that implement particular instructions, steps or operations, such as the operations described herein with respect blocks 62-76 of method 60 in FIG. 3.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of example embodiments are disclosed herein. For example, in one embodiment a method can be implemented for integrating communications devices into industrial wireless systems. Such an example method can includes steps, instructions, or operations such as: enabling a communications interface on a field device access point from a user interface associated with a wireless device manager, wherein the field device access point communicates with an industrial wireless network (the communications interface is based on a serial communications protocol); configuring the field device access point to enable at least one register to read from different slave devices at different speeds and different data types; implementing a proxy object that communicates with a plurality of RTU (Remote Terminal Unit) devices and further implementing a cache to store read data from the different RTU slave devices among the plurality of RTU devices; and periodically publishing the read data to the wireless device manager through a wireless interface, thereby permitting the plurality of RTU devices or a plurality of TCP (Transmission Control Protocol) devices to connect to the industrial wireless network using the field device access point as a result of the enabling of the communications interface on the field access point, the configuring the field device access point, the implementing the proxy object, and the cache and the periodically publishing the read data to the wireless device manager.

In some example embodiments, the aforementioned serial communications protocol can comprise an industrial serial communications protocol such as, for example, a Modbus serial communications protocol. In addition, each of the plurality of TCP devices can be based on the serial communications protocol. Additionally, in some example embodiments, each of the plurality of TCP devices may be a Modbus-TCP device. In other example embodiments, each RTU device among the plurality of RTU devices can be based on the serial communications protocol. In some example embodiments, each of the RTU devices may be a Modbus-RTU device. Also, in some example embodiments, the serial communications protocol can be a wireless communications protocol for communicating data wirelessly.

In another example embodiment, a system for integrating communication devices into industrial wireless systems can be implemented, which includes at least one processor and a non-transitory computer-usable medium embodying computer program code. In such an example system, the computer-usable medium is capable of communicating with the at least one processor. The computer program code includes instructions executable by the at least one processor and configured for: enabling a communications interface on a field device access point from a user interface associated with a wireless device manager, wherein the field device access point communicates with an industrial wireless network, the communications interface based on a serial communications protocol; configuring the field device access point to enable at least one register to read from different slave devices at different speeds and different data types;

implementing a proxy object that communicates with a plurality of RTU (Remote Terminal Unit) devices and further implementing a cache to store read data from the different RTU slave devices among the plurality of RTU devices; and periodically publishing the read data to the wireless device manager through a wireless interface, thereby permitting the plurality of RTU devices or a plurality of TCP (Transmission Control Protocol) devices to connect to the industrial wireless network using the field device access point as a result of enabling the communications interface on the field access point, configuring the field device access point, implementing the proxy object, and the cache and periodically publishing the read data to the wireless device manager.

In yet another example embodiment, a system for integrating communications devices into industrial wireless systems can be implemented, which includes, for example: an industrial wireless network and a field device access point, wherein a communications interface on the field device access point is enabled from a user interface associated with a wireless device manager, wherein the field device access point communicates with the industrial wireless network, the communications interface based on a serial communications protocol; the field device access point configured to enable at least one register to read from different slave devices at different speeds and different data types; a plurality of RTU (Remote Terminal Unit) devices and a proxy object, wherein the proxy object communicates with the plurality of RTU (Remote Terminal Unit) devices; a cache that stores read data from the different RTU slave devices among the plurality of RTU devices; and wherein the read data is periodically published to the wireless device manager through a wireless interface, thereby permitting the plurality of RTU devices or a plurality of TCP (Transmission Control Protocol) devices to connect to the industrial wireless network using the field device access point as a result of enabling the communications interface on the field access point, configuring the field device access point, implementing the proxy object, and the cache and periodically publishing the read data to the wireless device manager.

The foregoing description of the embodiments has been provided for purposes of illustration and description. The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for integrating communication devices into industrial wireless systems, said method comprising:
enabling a communications interface on a field device access point from a user interface associated with a wireless device manager, wherein said field device access point communicates with an industrial wireless network, said communications interface based on a serial communications protocol;
configuring said field device access point to enable at least one register to read from different slave devices at different speeds and different data types;
implementing a proxy object that communicates with a plurality of RTU (Remote Terminal Unit) devices and further implementing a cache to store read data from said different RTU slave devices among said plurality of RTU devices; and
periodically publishing said read data to said wireless device manager through a wireless interface, thereby permitting said plurality of RTU devices or a plurality of TCP (Transmission Control Protocol) devices to connect to said industrial wireless network using said field device access point as a result of said enabling said communications interface on said field access point, said configuring said field device access point, said implementing said proxy object, and said cache and said periodically publishing said read data to said wireless device manager.

2. The method of claim 1 wherein said serial communications protocol comprises an industrial serial communications protocol.

3. The method of claim 1 wherein said serial communications protocol comprises a Modbus serial communications protocol.

4. The method of claim 1 wherein each of plurality of TCP devices are based on said serial communications protocol.

5. The method of claim 4 wherein said each of said plurality of TCP devices comprises a Modbus-TCP device.

6. The method of claim 1 wherein each of said RTU devices among said plurality of RTU devices is based on said serial communications protocol.

7. The method of claim 1 wherein serial communications protocol further comprises a wireless communications protocol for communicating data wirelessly.

8. A system for integrating communication devices into industrial wireless systems, said system comprising:
at least one processor; and
a non-transitory computer-usable medium embodying computer program code, said computer-usable medium capable of communicating with said at least one processor, said computer program code comprising instructions executable by said at least one processor and configured for:
enabling a communications interface on a field device access point from a user interface associated with a wireless device manager, wherein said field device access point communicates with an industrial wireless network, said communications interface based on a serial communications protocol;
configuring said field device access point to enable at least one register to read from different slave devices at different speeds and different data types;
implementing a proxy object that communicates with a plurality of RTU (Remote Terminal Unit) devices and further implementing a cache to store read data from said different RTU slave devices among said plurality of RTU devices; and
periodically publishing said read data to said wireless device manager through a wireless interface, thereby permitting said plurality of RTU devices or a plurality of TCP (Transmission Control Protocol) devices to connect to said industrial wireless network using said field device access point as a result of said enabling said communications interface on said field access point, said configuring said field device access point, said implementing said proxy object, and said cache and said periodically publishing said read data to said wireless device manager.

9. The system of claim 8 wherein said serial communications protocol comprises an industrial serial communications protocol.

10. The system of claim 8 wherein said serial communications protocol comprises a Modbus serial communications protocol.

11. The system of claim 8 wherein each of plurality of TCP devices are based on said serial communications protocol.

12. The system of claim 11 wherein said each of said plurality of TCP devices comprises a Modbus-TCP device.

13. The system of claim 8 wherein each of said RTU devices among said plurality of RTU devices is based on said serial communications protocol.

14. The system of claim 13 wherein said each of said RTU devices comprises a Modbus-RTU device.

15. The system of claim 8 wherein said serial communications protocol further comprises a wireless communications protocol for communicating data wirelessly.

16. A system for integrating communication devices into industrial wireless systems, said system comprising:
   an industrial wireless network and a field device access point, wherein a communications interface on said field device access point is enabled from a user interface associated with a wireless device manager, wherein said field device access point communicates with said industrial wireless network, said communications interface based on a serial communications protocol;
   said field device access point configured to enable at least one register to read from different slave devices at different speeds and different data types;
   a plurality of RTU (Remote Terminal Unit) devices and a proxy object, wherein said proxy object communicates with said plurality of RTU (Remote Terminal Unit) devices;
   a cache that stores read data from said different RTU slave devices among said plurality of RTU devices; and
   wherein said read data is periodically published to said wireless device manager through a wireless interface, thereby permitting said plurality of RTU devices or a plurality of TCP (Transmission Control Protocol) devices to connect to said industrial wireless network using said field device access point as a result of said enabling said communications interface on said field access point, said configuring said field device access point, said implementing said proxy object, and said cache and said periodically publishing said read data to said wireless device manager.

17. The system of claim 16 wherein said each of said plurality of TCP devices comprises a Modbus-TCP device.

18. The system of claim 16 wherein said each of said RTU devices comprises a Modbus-RTU device.

19. The system of claim 16 wherein said serial communications protocol comprises a Modbus serial communications protocol.

20. The method of claim 16 wherein said serial communications protocol further comprises a wireless communications protocol for communicating data wirelessly.

* * * * *